Mar. 27, 1923.

1,449,705

B. W. ST.CLAIR

INSTRUMENT NEEDLE

Filed May 1, 1922

Inventor:
Byron W. St Clair,
by Albert Davis
His Attorney.

Patented Mar. 27, 1923.

1,449,705

UNITED STATES PATENT OFFICE.

BYRON W. ST. CLAIR, OF LYNN, MASSACHUSETTS, ASSIGNOR TO GENERAL ELECTRIC COMPANY, A CORPORATION OF NEW YORK.

INSTRUMENT NEEDLE.

Application filed May 1, 1922. Serial No. 557,756.

*To all whom it may concern:*

Be it known that I, BYRON W. ST. CLAIR, a citizen of the United States, residing at Lynn, in the county of Essex, State of Massachusetts, have invented certain new and useful Improvements in Instrument Needles, of which the following is a specification.

My invention relates to instrument pointers or needles and its object is to provide a simple and inexpensive means of preventing mechanical vibrations in such instrument parts.

In instruments susceptible to vibrations, such for example, as those set up in alternating current instruments, resonant vibrations of the pointer is oftentimes a source of trouble. This is particularly true if the pointer is comparatively long. It has heretofore been proposed to make such pointers of sufficient rigidity to prevent vibrations from being set up therein. It is difficult, however, to make a pointer sufficiently rigid for this purpose without unduly increasing its weight or complicating its construction. In carrying my invention into effect I make a pointer of simple mechanical construction and as light as possible without regard for its rigidity and prevent resonant vibrations by providing one or more small weights which may be so placed along its length as to damp out all vibrations tending to be set up therein.

Figure 1:
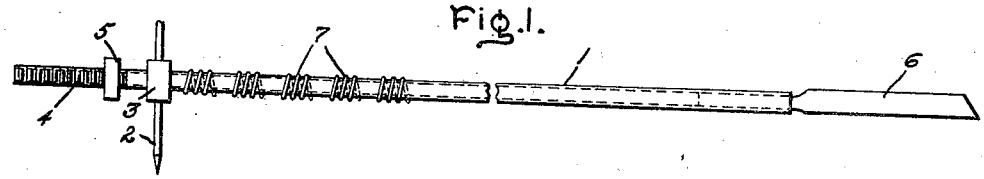
Figure 2:
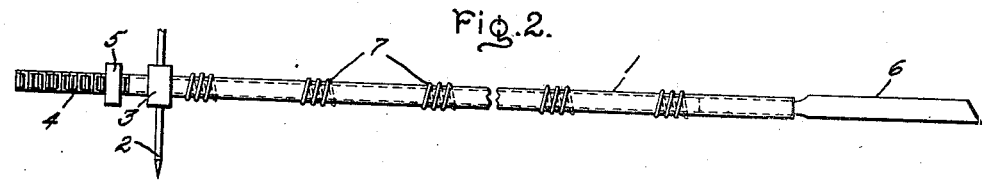
Figure 3:
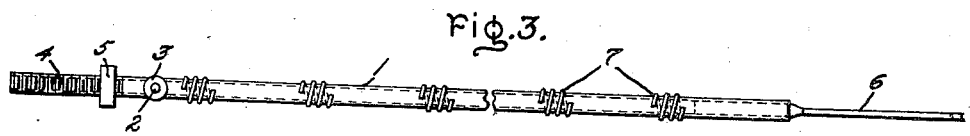

The features of my invention which I believe to be novel and patentable will be pointed out in the claims appended hereto. The construction and manner of using my invention will be explained in connection with the accompanying drawings in which Fig. 1 represents a pointer provided with a plurality of small slidable weights located adjacent the pivot point; Fig. 2 shows a pointer with the weights distributed thereon in a manner to damp out resonant vibrations; and Fig. 3 is a top view of Fig. 2.

Referring now to the drawings, in which like parts are designated by like numerals throughout, 1 indicates the body of an instrument pointer or needle. In this instance the body portion 1 is made of a hollow tube such as aluminum and is suitably secured at 3 to the usual pivoted shaft 2 which carries in addition to the pointer the other movable parts of the instrument not shown. The short end 4 of the pointer 2 is provided with a weight 5. In this instance the short end 4 of the pointer is threaded and the weight 5 is made in the form of a nut so as to be adjusted toward and away from the shaft 2 for balancing purposes. The long end of the pointer 2 preferably, although not necessarily, terminates in a narrow indicating portion 6, which portion is adapted to swing over the usual scale not shown. In the present illustration the portion 6 constitutes a small flat bar one end of which is cut down so as to be inserted in the end of the pointer tube 1 with a snug fit. The narrow axis of the bar 6 will be turned so as to be parallel with the axis of the shaft 2 as illustrated. The pointer as thus constructed is light and inexpensive and may be made as long as desirable, the balance of the different lengths being taken care of by the adjustable weight 5.

As thus far explained such a pointer when used, for example, in an alternating current instrument would be a source of trouble due to vibrations set up therein in resonance with the electrical frequency of the system on which it is used. In order to prevent such vibrations and still permit the use of a pointer of simple and light construction, I provide a plurality of small weights 7 which are adapted to be adjusted along the pointer tube 1 to the point or points which tend to vibrate with a maximum amplitude and thus prevent such vibrations from being set up. The small weights 7 may be made of a few turns of wire in the form of a spiral spring which grasps the pointer tube with sufficient force to cause them to stay in any position to which they may be moved thereon.

To adjust a pointer, according to my invention, the weights 7 are first placed adjacent the shaft 2 as illustrated in Fig. 1. The moving element of the instrument is approximately balanced with the weights 7 in this position and the instrument is electrically connected to an alternating current machine whose frequency can be varied over wide limits. The frequency is changed until a point is reached where the needle vibration is a maximum. Generally, the needle vibrates with a single antinode approximately at the middle of its long end. A weight is moved to this point and the frequency and points of resonance again noted. Generally, the frequency is quite a ways from the previous frequency and the tendency is for the needle to vibrate in two loops. This time two more weights are moved out, one to each new antinodal point. The same process is continued until a point is secured that practically prevents the needle from vibrating at any commercial frequency. In practice, five or possibly six small weights 7 will be necessary for this purpose. It is of course necessary to rebalance the movable elements by adjusting the weight 5, but this does not affect the mechanical resonance of the needle. With this arrangement, it is possible to use the simplest kind of needle construction consisting of a single aluminum tube and I have found this to be a great advantage in long pointer laboratory standard instruments.

When the instrument is to be used on a constant frequency system, it will only be necessary to adjust the pointer for that frequency. The number of weights 7 necessary to properly adjust a pointer will depend on its length and the frequency on which it is to be used. The weights 7 may be slipped on or taken off the end of the tube 1 when the terminal piece 6 is removed. Although my invention is particularly useful in connection with alternating current instruments, it is not limited thereto but may be used in any instrument where the pointer is susceptible to vibration from any source.

What I claim as new and desire to secure by Letters Patent of the United States, is:

1. In an instrument an indicating element therefore having a sufficient free length as to be susceptible to vibration and a plurality of small weights adjustable along said element for preventing vibrations from being set up in said element.

2. In an instrument a member having such dimensions and so supported as to be susceptible to resonant vibrations and means adapted to be placed at the antinodal points of said member for preventing such vibrations.

3. In an alternating current instrument a pivoted pointer having a long indicating end and a short balancing end, a plurality of small adjustable weights on said long end and an adjustable balancing weight on said short end.

4. A pointer for alternating current instruments comprising a pivoted tube having a long indicating arm and a short balancing arm, said long arm being provided with a plurality of slidable weights adapted to be positioned so as to prevent resonant vibrations of said tube and said short arm being threaded and provided with a weighted nut for balancing said pointer.

5. An instrument pointer provided with slidable weights positioned to prevent resonant vibrations of said pointer and other means for mechanically balancing said pointer without changing the mechanical resonance thereof.

6. In an indicating instrument the method of preventing resonant vibration of the pointer thereof which consists in placing damping members at the antinodal points of said pointer.

In witness whereof, I have hereunto set my hand this 27th day of April, 1922.

BYRON W. ST. CLAIR.